(12) United States Patent
Mouridsen

(10) Patent No.: US 12,126,261 B2
(45) Date of Patent: *Oct. 22, 2024

(54) METHOD FOR PARALLELING OF INTERLEAVED POWER CONVERTERS

(71) Applicant: SCHNEIDER ELECTRIC IT CORPORATION, Foxboro, MA (US)

(72) Inventor: Jonas Sonsby Mouridsen, Odense V (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,804

(22) Filed: Jun. 16, 2023

(65) Prior Publication Data

US 2024/0055994 A1 Feb. 15, 2024

Related U.S. Application Data

(63) Continuation of application No. 17/489,183, filed on Sep. 29, 2021, now Pat. No. 11,863,074.

(51) Int. Cl.
*H02M 3/158* (2006.01)
*H02J 9/06* (2006.01)
(Continued)

(52) U.S. Cl.
CPC ........... *H02M 3/1586* (2021.05); *H02J 9/062* (2013.01); *H02M 1/0009* (2021.05); *H02M 1/14* (2013.01); *H02M 7/483* (2013.01)

(58) Field of Classification Search
CPC ............... H02M 3/158; H02M 3/1586; H02M 1/0009; H02M 1/14; H02M 7/483; H02J 9/062
(Continued)

(56) References Cited

U.S. PATENT DOCUMENTS 6,809,943 B2 10/2004 Lanni
9,595,841 B2 * 3/2017 Shimada ................. H02M 1/32
(Continued)

FOREIGN PATENT DOCUMENTS

WO WO-2005111484 A2 * 11/2005 ......... E21B 33/0355

OTHER PUBLICATIONS

Extended European Search Report from corresponding European Application No. 22192589.4 dated Feb. 20, 2023.

*Primary Examiner* — Yemane Mehari
(74) *Attorney, Agent, or Firm* — Lando & Anastasi, LLP

(57) ABSTRACT

Examples of the disclosure include a UPS comprising an output to be coupled to a load, a first converter leg to provide a first voltage to the output and including at least one of a first relay or fuse, a second converter leg in parallel with the first converter leg including at least one of a second relay or fuse and configured to provide a second voltage to the output out of phase with the first converter leg providing the first voltage signal, current sensors coupled to the first and second converter legs, respectively, and configured to provide a first signal indicative of a current in the first converter leg and a second signal indicative of a current in the second converter leg, respectively, and at least one controller to receive the signals, determine a current difference between the converter legs based on the signals, and decrease the current difference.

20 Claims, 8 Drawing Sheets

(51) Int. Cl.
  *H02M 1/00* (2006.01)
  *H02M 1/14* (2006.01)
  *H02M 7/483* (2007.01)
(58) Field of Classification Search
  USPC .......................................................... 323/271
  See application file for complete search history.

(56) References Cited

U.S. PATENT DOCUMENTS

| | | | |
|---|---|---|---|
| 9,871,436 B1 | 1/2018 | Jiao et al. | |
| 10,097,078 B2* | 10/2018 | Rayner | H02M 3/1584 |
| 10,396,684 B2* | 8/2019 | Mu | H02M 7/487 |
| 11,863,074 B2* | 1/2024 | Mouridsen | H02M 1/0043 |
| 2016/0308389 A1 | 10/2016 | Bush et al. | |
| 2021/0265858 A1 | 8/2021 | Antoniazza et al. | |

* cited by examiner

METHOD FOR PARALLELING OF INTERLEAVED POWER CONVERTERS

CROSS-REFERENCE TO RELATED APPLICATIONS

This application claims priority under 35 U.S.C. § 120 as a continuation of U.S. application Ser. No. 17/489,183, titled METHOD FOR PARALLELING OF INTERLEAVED POWER CONVERTERS, filed on Sep. 29, 2021, which is hereby incorporated by reference in its entirety.

BACKGROUND

1. Field of the Disclosure

At least one example in accordance with the present disclosure relates generally to multi-phase power converters.

2. Discussion of Related Art

Power devices, such as uninterruptible power supplies (UPSs), may be used to provide regulated, uninterrupted power for sensitive and/or critical loads, such as computer systems and other data processing systems. UPSs may include one or more power converters, such as DC/DC converters, DC/AC converters, AC/DC converters, and so forth. Some power converters may include multiple interleaved legs, each carrying a portion of power converted by the power converter.

SUMMARY

According to at least one aspect of the present disclosure, an uninterruptible power supply is provided comprising a first input configured to be coupled to a primary power source, a second input configured to be coupled to a backup power source, an output configured to be coupled to a load, a first converter leg configured to provide a first voltage signal to the output, wherein the first converter leg includes at least one of a first relay or a first fuse, a second converter leg configured to provide a second voltage signal to the output and configured to be coupled in parallel with the first converter leg, wherein the second converter leg provides the second voltage signal out of phase with the first converter leg providing the first voltage signal, and wherein the second converter leg includes at least one of a second relay or a second fuse, a first current sensor coupled to the first converter leg and being configured to provide a first current-sense signal indicative of a first current in the first converter leg, a second current sensor coupled to the second converter leg and being configured to provide a second current-sense signal indicative of a second current in the second converter leg, and at least one controller configured to receive the first current-sense signal and the second current-sense signal, determine a current difference between the first converter leg and the second converter leg based on the first current-sense signal and the second current-sense signal, and decrease the current difference.

In some examples, the first converter leg includes a first filter and the second converter leg includes a second filter. In various examples, the at least one of the first relay or the first fuse is coupled between the first filter and the output, and the at least one of the second relay or the second fuse is coupled between the second filter and the output. In at least one example, the first filter includes at least one first capacitor and wherein the second filter includes at least one second capacitor. In some examples, the first filter includes at least one first inductor coupled to the at least one first capacitor and wherein the second filter includes at least one second inductor coupled to the at least one second capacitor. In various examples, the first filter includes a first choke, and the second filter includes a second choke, the first choke being inductively coupled to the second choke.

In at least one example, the first choke is configured to induce, responsive to a first ripple current passing through the first converter leg, a first induced current in the second choke, and the second choke is configured to induce, responsive to a second ripple current passing through the second converter leg, a second induced current in the first choke. In some examples, the at least one of the first relay or the first fuse includes the first relay and the first fuse. In various examples, the at least one of the second relay or the second fuse includes the second relay and the second fuse. In at least one example, the first converter leg includes at least one first power-conversion switch having a first switch input and a first switch output, and the second converter leg includes at least one second power-conversion switch having a second switch input and a second switch output.

In some examples, the at least one of the first relay or the first fuse is coupled between the first switch input and at least one of the first input or the second input, and the at least one of the second relay or the second fuse is coupled between the second switch input and at least one of the first input or the second input. In various examples, the at least one of the first relay or the first fuse is coupled between the first switch output and the output, and the at least one of the second relay or the second fuse is coupled between the second switch output and the output.

According to aspects of the disclosure, a method of assembling an uninterruptible power supply is provided, the method comprising providing a first converter leg having at least one of a first relay or a first fuse, providing a second converter leg having at least one of a second relay or a second fuse, providing a first current sensor configured to provide a first current-sense signal indicative of a first current in the first converter leg, providing a second current sensor configured to provide a second current-sense signal indicative of a second current in the second converter leg, providing at least one controller, coupling the first converter leg in parallel with the second converter leg, coupling the first current sensor to the first converter leg, coupling the second current sensor to the second converter leg, and coupling the at least one controller to the first converter leg and the second converter leg to receive the first current-sense signal and the second current-sense signal, determine a current difference between the first converter leg and the second converter leg based on the first current-sense signal and the second current-sense signal, and decrease the current difference between the first converter leg and the second converter leg.

In some examples, the uninterruptible power supply includes an output, the method further comprising providing, in the first converter leg, a first filter, providing, in the second converter leg, a second filter, coupling the at least one of the first relay or the first fuse between the first filter and the output, and coupling the at least one of the second relay or the second fuse between the second filter and the output. In various examples, providing the first filter includes providing at least one first capacitor and providing the second filter includes providing at least one second capacitor, the method further comprising coupling the at least one first capacitor to the at least one of the first relay or the first fuse, and coupling the at least one second capacitor to the at least one of the second relay or the second fuse.

In at least one example, providing the first filter includes providing at least one first inductor and providing the second filter includes providing at least one second inductor, the method further comprising coupling the at least one first inductor to the at least one first capacitor, and coupling the at least one second inductor to the at least one second capacitor. In some examples, the method includes providing a first choke and a second choke, coupling the first choke to the at least one of the first relay or the first fuse, coupling the second choke to the at least one of the second relay or the second fuse, and inductively coupling the first choke to the second choke. In various examples, providing the first converter leg having the at least one of the first relay or the first fuse includes providing the first relay and the first fuse. In at least one example, providing the first converter leg having the at least one of the second relay or the second fuse includes providing the second relay and the second fuse.

According to aspects of the disclosure, a non-transitory computer-readable medium storing thereon sequences of computer-executable instructions for controlling an uninterruptible power supply including at least one input, an output, a first converter leg, the first converter leg including a first current sensor and at least one of a first relay or a first fuse, and a second converter leg configured to be coupled in parallel with the first converter leg, the second converter leg including a second current sensor and at least one of a second relay or a second fuse is provided, the sequences of computer-executable instructions including instructions that instruct at least one processor to control the first converter leg to provide a first voltage signal to the output via the at least one of the first relay or the first fuse, control the second converter leg to provide a second voltage signal to the output via the at least one of the second relay or the second fuse, wherein the second converter leg provides the second voltage signal out of phase with the first converter leg providing the first voltage signal, receive a first current-sense signal indicative of a first current in the first converter leg from the first current sensor, receive a second current-sense signal indicative of a second current in the second converter leg from the second current sensor, determine a current difference between the first converter leg and the second converter leg based on the first current-sense signal and the second current-sense signal, and decrease the current difference between the first converter leg and the second converter leg.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
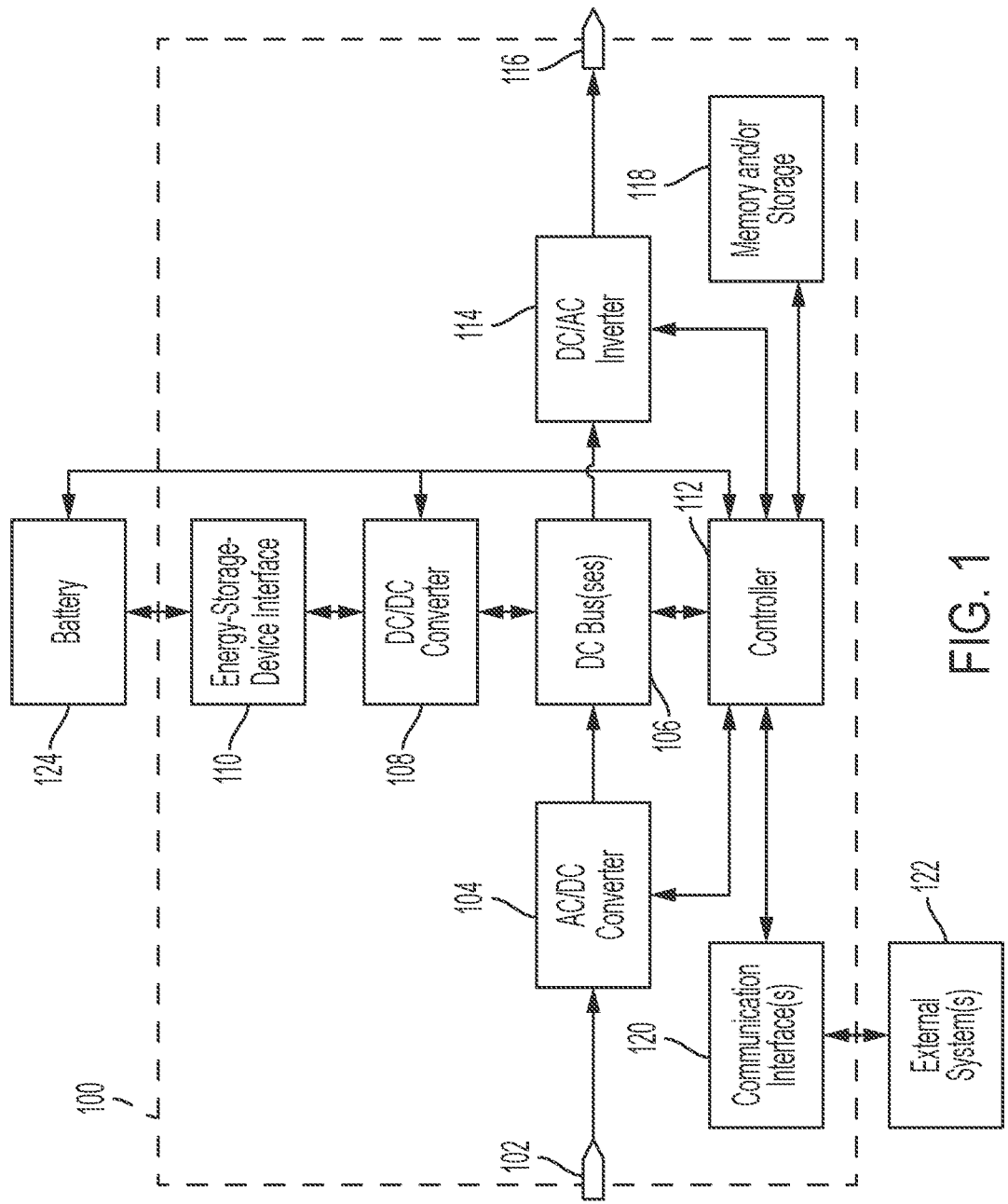
FIG. 1 illustrates a block diagram of an uninterruptible power supply (UPS) according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Power devices are configured to provide output power to a load. For example, an uninterruptible power supply (UPS) is a power device configured to provide regulated, uninterrupted power to a load. Single-phase UPSs provide single-phase power, and multi-phase UPSs provide multi-phase power. For example, a three-phase UPS provides three-phase power to a load.

Power devices may include one or more power converters. Power converters include devices to convert power from one state to another, such as rectifiers, inverters, power-factor-correction circuits (PFCs), DC/DC converters, and so forth. Power converters may include multiple converter legs, each configured to convert a respective portion of input power. In some power converters, the legs may be coupled in parallel and interleaved together. Each interleaved leg converts a respective portion of the power provided by the power converter. Interleaving may advantageously reduce a ripple current in the power converter.

Interleaved multi-leg converters may include common components. Common components are common amongst each of the converter legs, such that power provided by each of the converter legs is provided to the common components. Conversely, individual components are components within or coupled to a single leg of the multi-leg converters. In some examples, individual components only receive power from the converter leg in which the individual component is disposed rather than receiving power from each leg in a converter.

In some interleaved multi-leg converters, common components may include at least one common filter capacitor, filter inductor, relay, and/or fuse. At least because the common components receive current from each of the multiple legs, the common components may have high current ratings in order to sustain the high aggregate currents provided to the common components.

Such high current ratings may introduce practical manufacturing challenges. For example, it may be difficult or impossible to acquire PCB-mounted components having sufficiently high current ratings. Moreover, regulatory requirements may be difficult or impossible to attain. For example, Underwriters Laboratories (UL) requirements may not accept hard paralleling of common components such as backfeed relays and fuses, as failure of one component may cause a voltage spike or a high current in the non-failing components. Further still, a common fuse may have a significant clearing energy as a result of the high common current conducted by the common fuse. Such significant clearing energy may disadvantageously damage adjacent components, making troubleshooting difficult and complicating efforts to live-swap components.

Examples of the disclosure include a multi-leg converter having multiple parallel and/or interleaved legs. Each converter leg may include one or more individual components. The one or more individual components may include components that are implemented as common components in other topologies. The one or more individual components may include, for example, one or more fuses, relays, filters, current sensors, and so forth. In some examples, each converter leg includes a current sensor configured to provide a current-sense signal indicative of a current in the respective converter leg to at least one controller. The at least one controller may determine a current difference between the paralleled converter legs and decrease the current difference to balance the converter legs. For example, the at least one controller may control one or more power converters of the respective converter legs to modulate a current in one or more of the converter legs. Accordingly, examples of the disclosure include multi-leg power converters having an increased power density with a reduction in size of converter components, such as passive components.

Current power-conversion systems, such as power converters in UPSs, may include interleaved converter legs with one or more common components coupled to all of the interleaved converter legs. Such power-conversion systems may operate inefficiently, because the common components conduct an entire converter current, which may require very large components that are difficult to acquire commercially, reduce power density, have significant clearing energy, and complicate efforts to obtain UL certification. This is a technical problem.

An exemplary embodiment of a power-conversion system includes an uninterruptible power supply having a first input configured to be coupled to a primary power source, a second input configured to be coupled to a backup power source, an output configured to be coupled to a load, a first converter leg configured to provide a first voltage signal to the output, wherein the first converter leg includes at least one of a first relay or a first fuse, a second converter leg configured to provide a second voltage signal to the output and configured to be coupled in parallel with the first converter leg, wherein the second converter leg provides the second voltage signal out of phase with the first converter leg providing the first voltage signal, and wherein the second converter leg includes at least one of a second relay or a second fuse, a first current sensor coupled to the first converter leg and being configured to provide a first current-sense signal indicative of a first current in the first converter leg, a second current sensor coupled to the second converter leg and being configured to provide a second current-sense signal indicative of a second current in the second converter leg, and at least one controller configured to receive the first current-sense signal and the second current-sense signal, determine a current difference between the first converter leg and the second converter leg based on the first current-sense signal and the second current-sense signal, and decrease the current difference.

At least this foregoing combination of features comprises a power-conversion system that serves as a technical solution to the foregoing technical problem. This technical solution is not routine and is unconventional. This technical solution is a practical application of the power-conversion system design that solves the foregoing technical problem and constitutes an improvement in the technical field of power converters at least by reducing a current conducted by converter components.

Example power converters may be implemented in any of many types of power devices. For purposes of explanation, examples are given in which power converters are implemented in a UPS. Example power converters may be implemented in any of many types of UPSs, such as offline UPSs, online UPSs, line-interactive UPSs, single-phase UPSs, multi-phase UPSs, and so forth. Accordingly, it is to be appreciated that example power converters are not limited to implementation in UPSs, nor are example power converters limited to specific UPS topologies.

FIG. 1 is a block diagram of a UPS 100 according to an example. The UPS 100 includes an input 102, an AC/DC converter 104, one or more DC busses 106, a DC/DC converter 108, an energy-storage-device interface 110, at least one controller 112 ("controller 112"), a DC/AC inverter 114, an output 116, a memory and/or storage 118, and one or more communication interfaces 120 ("communication interfaces 120"), which may be communicatively coupled to one or more external systems 122 ("external systems 122"). The input 102 is coupled to the AC/DC converter 104 and to an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the energy-storage-device interface 110, and is communicatively coupled to the controller 112. The energy-storage-device interface 110 is coupled to the DC/DC converter 108, and is configured to be coupled to at least one battery 124 and/or another energy-storage device. In some examples, the UPS 100 may include one or more energy-storage devices, such as the battery 124. The DC/AC inverter 114 is coupled to the one or more DC busses 106 and to the output 116, and is communicatively coupled to the controller 112. The output 116 is coupled to the DC/AC inverter 114, and to an external load (not pictured). The controller 112 is communicatively coupled to the AC/DC converter 104, the one or more DC busses 106, the DC/DC converter 108, the energy-storage-device interface 110, the DC/AC inverter 114, the memory and/or storage 118, and the communication interfaces 120.

The input 102 is configured to be coupled to an AC mains power source and to receive input AC power having an input voltage level. The UPS 100 is configured to operate in different modes of operation based on the input voltage of the AC power provided to the input 102. The controller 112 may determine a mode of operation in which to operate the UPS 100 based on whether the input voltage of the AC power is acceptable. The controller 112 may include or be coupled to one or more sensors configured to sense parameters of the input voltage. For example, the controller 112 may include or be coupled to one or more sensors configured to sense a voltage level of the AC power received at the input 102, one or more current sensors in each of the components 104, 108, and 114, and so forth.

When AC power provided to the input 102 is acceptable (for example, by having parameters, such as an input voltage value, that meet specified values, such as by falling within a range of acceptable input voltage values), the controller 112 controls components of the UPS 100 to operate in a normal mode of operation. In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the energy-storage-device interface 110. The energy-storage-device interface 110 receives the converted DC power, and provides the converted DC power to the battery 124 to charge the battery 124. The DC/AC inverter 114 receives DC power from the one or more DC busses 106, converts the DC power into regulated AC power, and provides the regulated AC power to the output 116 to be delivered to a load.

When AC power provided to the input 102 from the AC mains power source is not acceptable (for example, by having parameters, such as an input voltage value, that do not meet specified values, such as by falling outside of a range of acceptable input voltage values), the controller 112 controls components of the UPS 100 to operate in a backup mode of operation. In the backup mode of operation, DC power is discharged from the battery 124 to the energy-storage-device interface 110, and the energy-storage-device interface 110 provides the discharged DC power to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

The controller 112 may control aspects of the UPS 100 in addition to, or in lieu of, one or more of the acts discussed above. For example, the controller 112 may control and/or communicate one or more components or devices of the AC/DC converter 104, the DC/DC converter 108, and/or the DC/AC inverter 114, such as switches, fuses, relays, current sensors, and so forth. The controller 112 may store information in, and/or retrieve information from, the memory and/or storage 118. For example, the controller 112 may store information indicative of sensed parameters (for example, input-voltage values of the AC power received at the input 102, converter-current values of current in the components 104, 108, and/or 114, and so forth) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPSs, and so forth.

As discussed above, power converters, such as the AC/DC converter 104, DC/DC converter 108, and/or DC/AC inverter 114, may include multiple converter legs. The multiple converter legs may be interleaved together. Interleaving may advantageously reduce a ripple current in the respective power converter. An example power converter, which may be an example of any of the converters 104, 108, and/or 114, is provided with respect to FIG. 2. Specific examples may be provided with respect to the DC/AC inverter 114 for purposes of explanation.

Figure 2:
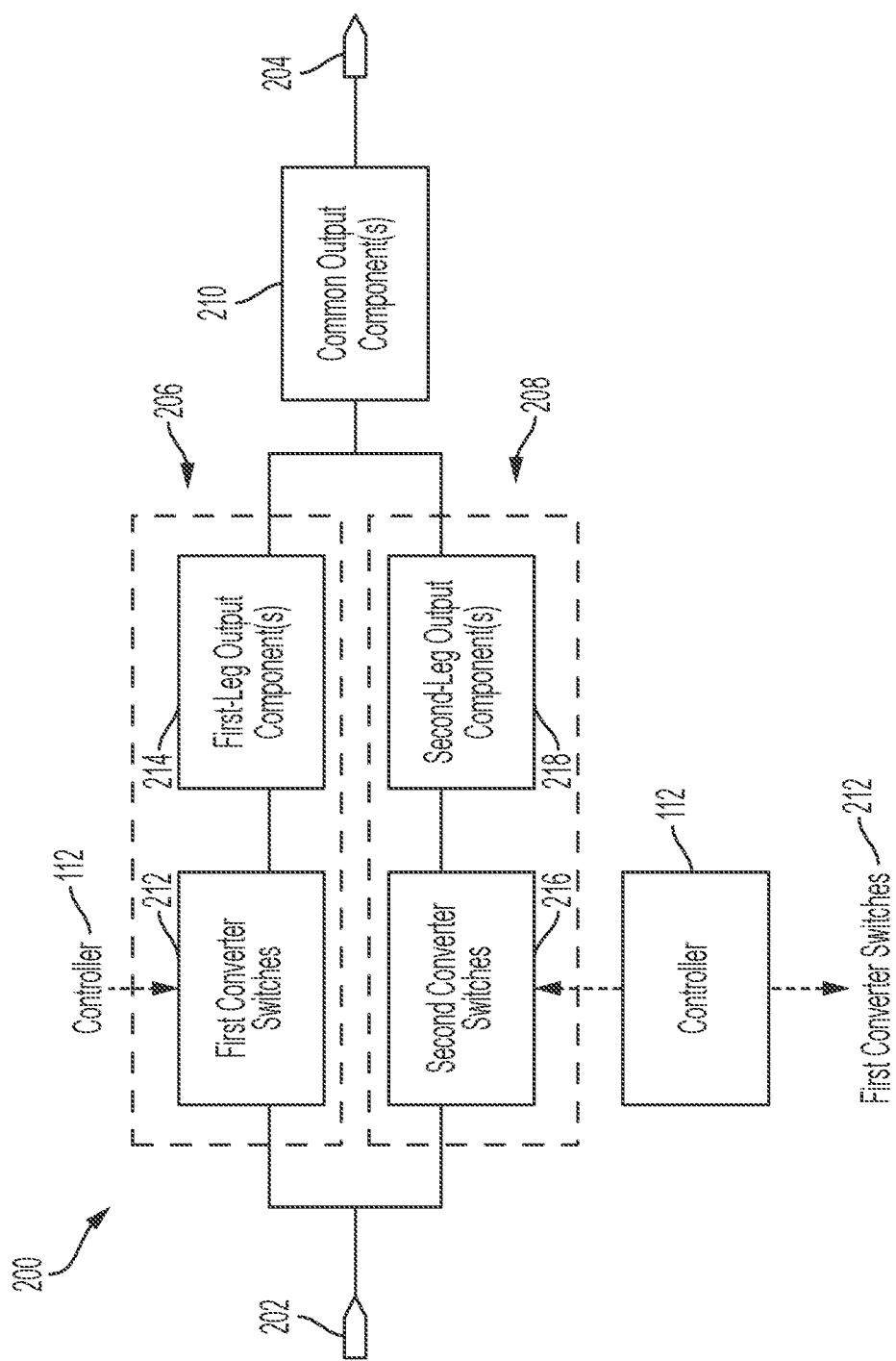
FIG. 2 illustrates a block diagram of a power converter according to an example.

FIG. 2 illustrates a block diagram of a power converter 200 according to an example. The power converter 200 may be an example of aspects of the DC/AC inverter 114 described above with reference to FIG. 1. It is to be appreciated that one or more components of the DC/AC inverter 114 may be omitted for purposes of clarity. The power converter 200 is an example of an interleaved power converter having two interleaved converter legs. It is to be appreciated that, in some examples, a power converter (such as the DC/AC inverter 114) may include more than two interleaved converter legs. Accordingly, no limitation is implied by the power converter 200 having two converter legs, which is provided for purposes of explanation only.

The power converter 200 includes an input 202, an output 204, a first converter leg 206, a second converter leg 208, and common output components 210. The first converter leg 206 includes at least one converter switch 212 ("first converter switches 212") and at least one first-leg output component 214 ("first output components 214"). The second converter leg 208 includes at least one converter switch 216 ("second converter switches 216") and at least one second-leg output component 218 ("second output components 218").

The input 202 is coupled to the first converter switches 212 and the second converter switches 216. In some examples, the input 202 may also be coupled to a power source (not illustrated). For example, where the power converter 200 is an example of the DC/AC inverter 114, the input 202 may be coupled to the DC busses 106. The first converter switches 212 are coupled to the input 202 at a switch input, are coupled to the first output components 214 at a switch output, and are communicatively coupled to the controller 112. The first output components 214 are coupled to the first converter switches 212 are a first connection and are coupled to the common output components 210 at a second connection. In some examples, one or more of the first output components 214 are communicatively coupled to the controller 112. The first converter leg 206 is coupled in parallel with the second converter leg 208.

The second converter switches 216 are coupled to the input 202 at a switch input, are coupled to the second output components 218 at a switch output, and are communicatively coupled to the controller 112. The second output components 218 are coupled to the second converter switches 216 at a first connection, and are coupled to the common output components 210 at a second connection. In some examples, one or more of the second output components 218 are communicatively coupled to the controller 112. The common output components 210 are coupled to the first output components 214 and the second output components 218 at a first connection, and are coupled to the output 204 at a second connection. The output 204 is coupled to the common output components 210 and is configured to be coupled to a load. For example, where the power converter 200 is an example of the DC/AC converter 114, the output 204 may be coupled to the output 116.

Accordingly, the power converter 200 includes output components in each respective leg (for example, the first output components 214 and second output components 218) and includes common output components common to both of the converter legs 206, 208 (for example, the common output components 210). In one example, the output components 214, 218 may each include a filter choke, and the common output components 210 may include one or more filtering components (for example, one or more capacitors and/or inductors), relays, fuses, and so forth. Because power passing through the common output components 210 is a combination of the power from the converter legs 206, 208, the current through the common output components 210 may be greater than a current through either of the converter legs 206, 208. The common output components 210 may therefore require a higher current rating than the output components 214, 218 require at least because the common output components 210 receive a higher current than each of the output components 214, 218 when the output components 214, 218 simultaneously provide a current to the common output components 210.

As discussed above, subjecting certain components to high currents may disadvantageously require large components that are difficult or impossible to mount on a PCB, amongst other disadvantages discussed above. The common output components 210, for example, may disadvantageously require large components such as relays, fuses, filtering components, and so forth. Conversely, the output components 214, 218 may not be as large at least because the output components 214, 218 conduct about half of the current that the common output components 210 conduct. Accordingly, in some examples, one or more of the common output components 210 may be removed and implemented instead in the output components 214, 218, enabling a reduction in size of the components. An example is provided with respect to FIG. 3.

Figure 3:
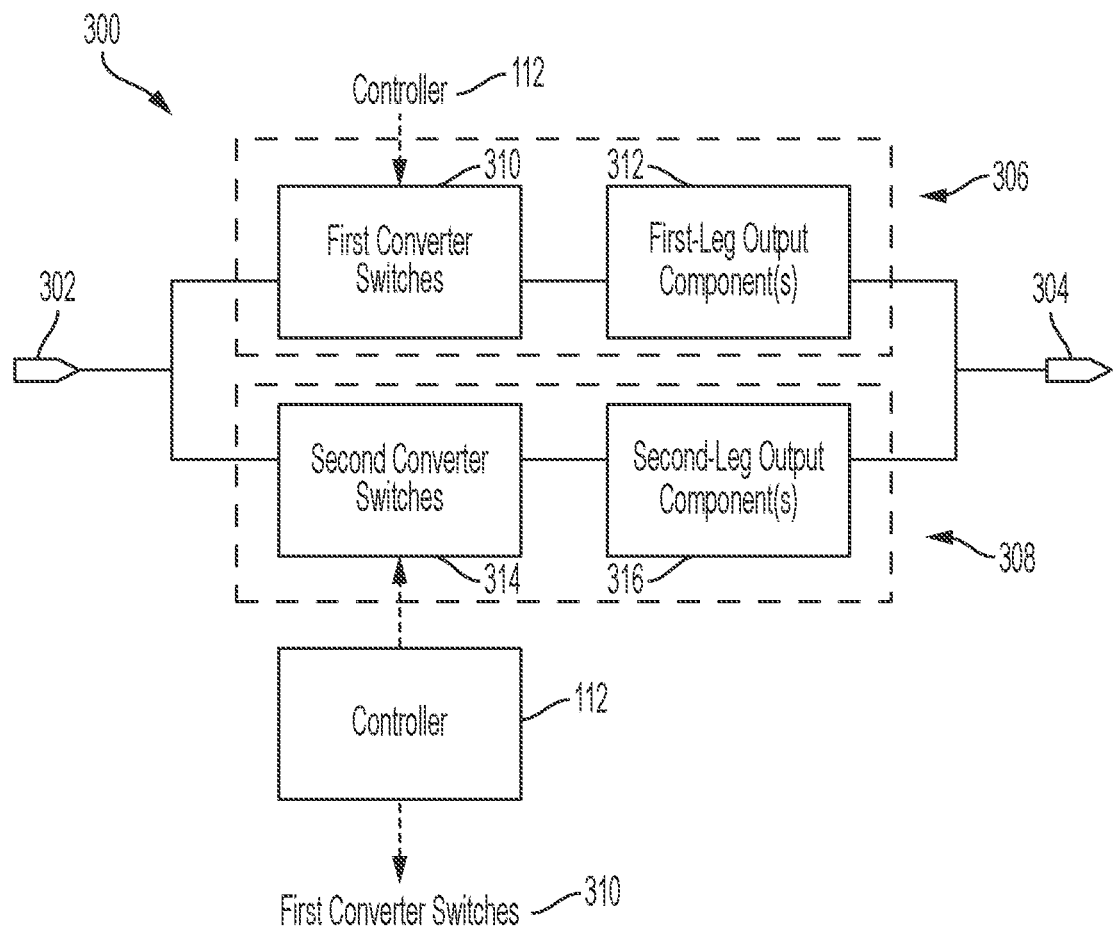
FIG. 3 illustrates a block diagram of a power converter according to another example.

FIG. 3 illustrates a block diagram of a power converter 300 according to another example. The power converter 300 may be an example of aspects of the DC/AC inverter 114 described above with reference to FIG. 1. It is to be appreciated that one or more components of the DC/AC inverter 114 may be omitted for purposes of clarity. The power converter 300 is another example of an interleaved power converter having two interleaved converter legs. It is to be appreciated that, in some examples, a power converter (such as the DC/AC inverter 114) may include more than two interleaved converter legs. Accordingly, no limitation is implied by the power converter 300 having two converter legs, which is provided for purposes of explanation only.

The power converter 300 includes an input 302, an output 304, a first converter leg 306, and a second converter leg 308. The first converter leg 306 includes at least one first converter switch 310 ("first converter switches 310") and at least one first-leg output component 312 ("first output components 312"). The second converter leg 308 includes at least one second converter switch 314 ("second converter switches 314") and at least one second-leg output component 316 ("second output components 316").

The input 302 is coupled to the first converter switches 310 and the second converter switches 314. In some examples, the input 302 may also be coupled to a power source (not illustrated). For example, where the power converter 300 is an example of the DC/AC inverter 114, the input 302 may be coupled to the DC busses 106 discussed above with respect to FIG. 1. As discussed in greater detail below, the input 302 may include several input connections, each configured to be coupled to a respective DC bus of the DC busses 106. The first converter switches 310 are coupled to the input 302 at a switch input, are coupled to the first output components 312 at a switch output, and are communicatively coupled to the controller 112. The first output components 312 are coupled to the first converter switches 310 are a first connection and are coupled to the output 304 at a second connection. In some examples, one or more of the first output components 312 are communicatively coupled to the controller 112. The first converter leg 306 is coupled in parallel with the second converter leg 308.

The second converter switches 314 are coupled to the input 302 at a switch input, are coupled to the second output components 316 at a switch output, and are communicatively coupled to the controller 112. The second output components 316 are coupled to the second converter switches 314 at a first connection, and are coupled to the output 304 at a second connection. In some examples, one or more of the second output components 316 are communicatively coupled to the controller 112. The output 304 is coupled to the first output components 312 and the second output components 316 at a first connection, and is configured to be coupled to a load. For example, where the power converter 300 is an example of the DC/AC inverter 114, the output 304 may be coupled to the output 116.

Figure 4:
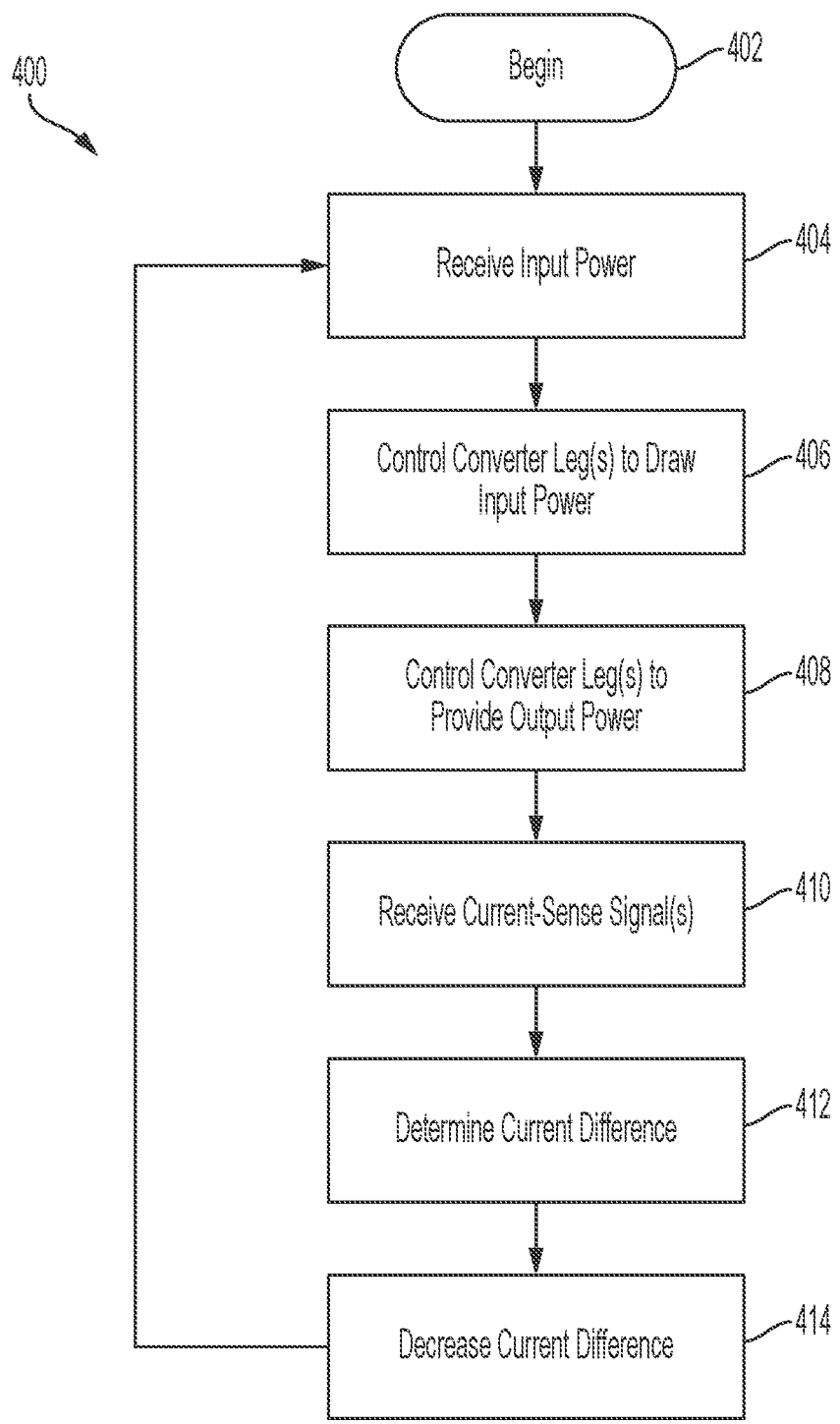
FIG. 4 illustrates a process of operating the power converter of FIG. 3 according to an example.

FIG. 4 illustrates a process 400 of operating a power converter, such as the power converter 300, according to an example. In various examples, at least part of the process 400 may be executed by the controller 112.

At act 402, the process 400 begins.

At act 404, input power is received at the input 302. For example, the input power may be received by the DC/AC inverter 114 via the DC busses 106 from a power source coupled to the input 102 and/or from the battery 124.

At act 406, the controller 112 controls the first converter leg 306 and/or the second converter leg 308 to draw power from the input 302. For example, the controller 112 may control the first converter switches 310 and/or the second converter switches 314 to draw power from the input 302. In some examples, the controller 112 may control the first converter switches 310 to draw power from the input 302 180° out of phase with the second converter switches 314. That is, control signals provided to the second converter switches 314 may be substantially similar or identical to control signals provided to the first converter switches 310, but phase-shifted by 180°. In some examples, the controller 112 may phase-shift control signals provided to a multi-leg converter based on a number of legs. For example, the phase shift may be equal to $\phi=360°/n$, where $\phi$ is the phase shift and n is the number of legs in the multi-leg converter. In other examples, the controller 112 may implement other methods of determining a phase shift. For example, the controller 112 may control the first converter switches 310 to draw power from the input 302 out of phase with the second converter switches 314 by a number of degrees other than 180°.

The converter switches 310, 314 may be implemented according to any of various known converter topologies, and the controller 112 may control the converter switches 310, 314 in accordance a known control scheme corresponding to the known converter topology. As discussed below, the controller 112 may control the converter legs 306, 308 to draw a balanced amount of power from the input 302 such that a current difference between the converter legs 306, 308 is minimized.

At act 408, the controller 112 controls the first converter switches 310 and/or the second converter switches 314 to provide output power to the output 304 via the first output components 312 and/or the second output components 316, respectively. For example, the controller 112 may control the converter switches 310, 314 to provide, via respective switch outputs, converted output power to the output components 312, 316. Converting the output power may include inverting DC power received at the input 302 to AC power for output at the output 304. As discussed in greater detail below, the output components 312, 316 may include one or more filtering components configured to filter the output power. The output components 312, 316 may further include one or more relays and/or fuses. In various examples, the output components 312, 316 provide power to the output 304 from the converter switches 310, 314 where, for example, the relay(s) are closed and conducting and the fuse(s) are conductive (that is, not "blown"). As discussed in greater detail below, the output components 312, 316 may include inductively coupled chokes configured to share current between the legs 306, 308, such as by sharing a ripple current between the legs 306, 308.

As discussed above with respect to act 406, the controller 112 may control the first converter switches 310 to draw power from the input 302 180° out of phase with the second converter switches 314. Accordingly, the controller 112 may control the first converter switches 310 such that a voltage signal provided by the first converter switches 310 (and, therefore, the first converter leg 306) to the output 304 is out of phase with a voltage signal provided by the second converter switches 314 (and, therefore, the second converter leg 308) to the output 304.

At act 410, the controller 112 receives a first current-sense signal from the first converter leg 306 and a second current-sense signal from the second converter leg 308. In various examples, the first output components 312 include at least one first current sensor (not illustrated), such as a current transformer (CT), and the second output components 316 include at least one second current sensor, such as a CT (not illustrated). The at least one first current sensor may measure a current through the first converter leg 306 and provide a first current-sense signal to the controller 112, and the at least one second current sensor may measure a current through the second converter leg 308 and provide a second current-sense signal to the controller 112. In some examples, a sampling frequency and/or period of the at least one first current sensor and of the at least one second sensor are aligned or standardized such that the first current-sense signal and the second current-sense signal are aligned.

At act 412, the controller 112 determines a current difference between the converter legs 306, 308. In some examples, the current difference is an instantaneous current difference. In other examples, the current difference is determined over a period of time, such as a complete switching cycle of signals provided to the converter switches 310, 314. The controller 112 may be configured to minimize the current difference such that a current through the converter legs 306, 308 is balanced (for example, equal to one another instantaneously or over a period of time).

At act 414, the controller 112 decreases the current difference determined at act 410. Decreasing the current difference may include increasing a power draw of one of the converter legs 306, 308 and/or decreasing a power draw of the other of the converter legs 306, 308. For example, if a current in the first converter leg 306 exceeds a current in the second converter leg 308, the controller 112 may decrease the current difference by controlling the first converter switches 310 to draw less power from the input 302, and/or by controlling the second converter switches 314 to draw more power from the input 302. The process 400 then returns to act 404.

Accordingly, the power converter 300 is configured to receive input power at the input 302, convert the input power at least with the converter switches 310, 314, and provide the converted output power to the output 304. A schematic diagram of one example of the power converter 300 is illustrated with respect to FIG. 5.

Figure 5:
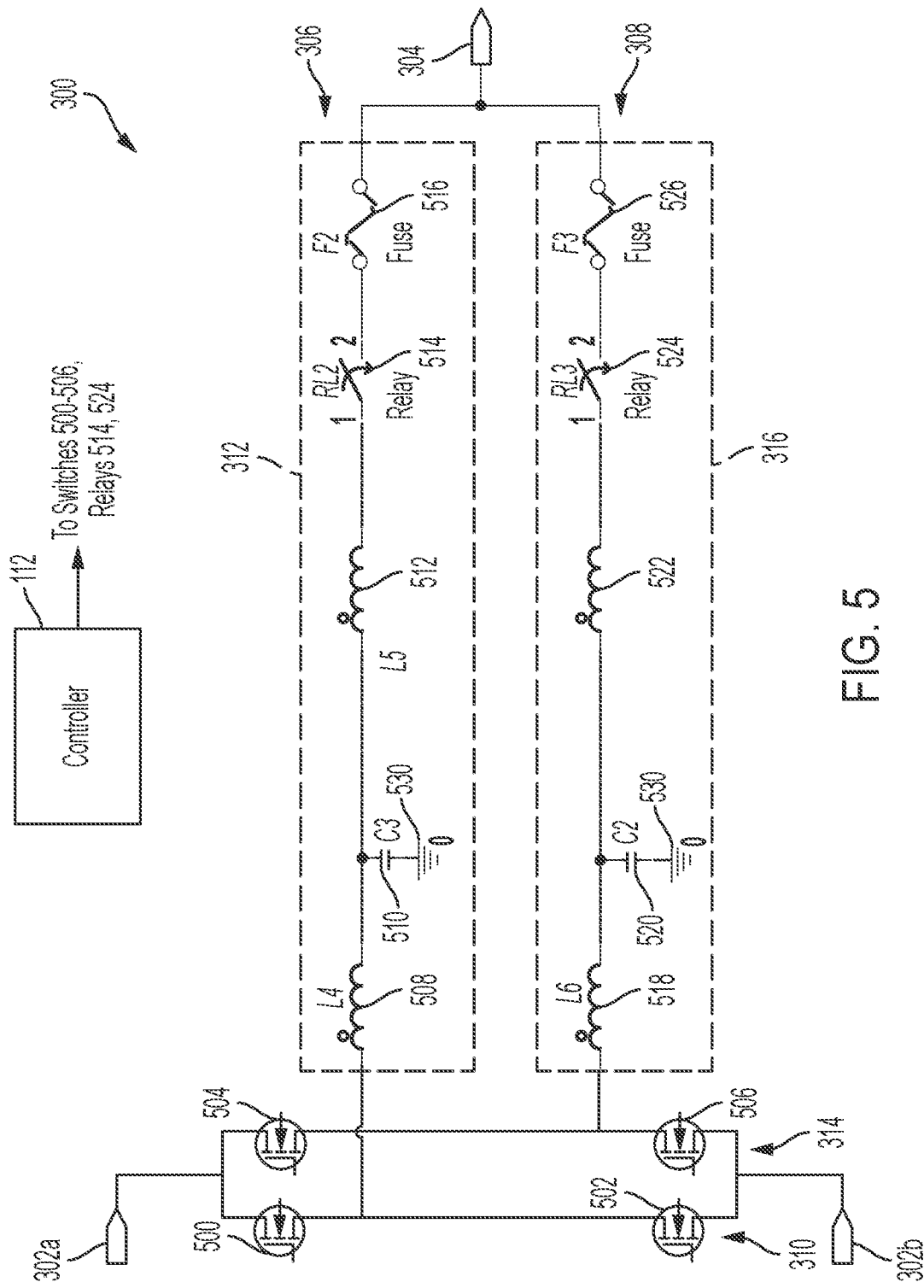
FIG. 5 illustrates a schematic diagram of the power converter of FIG. 3 according to an example.

FIG. 5 illustrates a schematic diagram of the power converter 300 according to an example. The power converter 300 of FIG. 5 includes a first input 302a and a second input 302b (collectively, the input 302), the output 304, the first converter leg 306 having the first converter switches 310 and the first output components 312, and the second converter leg 308 having the second converter switches 314 and the second output components 316. The first converter switches 310 include a first converter switch 500 and a second converter switch 502. The second converter switches 314 include a third converter switch 504 and a fourth converter switch 506.

The first output components 312 include a first inductor 508, a first capacitor 510, a second inductor 512 (the inductors 508, 512 and the first capacitor 510 collectively being a "first filter"), a first relay 514, and a first fuse 516. The second output components 316 include a third inductor 518, a second capacitor 520, a fourth inductor 522 (the inductors 518, 522 and the second capacitor 520 collectively being a "second filter"), a second relay 524, and a second fuse 526. In some examples, the first output components 312 and the second output components 316 each include one or more current sensors (for example, CTs) (not illustrated) configured to measure a respective current through the converter legs 306, 308 and send a respective current-sense signal to the controller 112. In various examples, each of the second inductor 512 and the fourth inductor 522 may be referred to as a "choke."

The first input 302a is coupled to the first converter switch 500 and the third converter switch 504, and is configured to be coupled to a power source or medium therefor, such as by being coupled to the DC busses 106. For example, the first input 302a may be coupled to a positive-voltage DC bus, or another type of bus, of the DC busses 106. The second input 302b is coupled to the second converter switch 502 and the fourth converter switch 506, and is configured to be coupled to a power source or medium therefor, such as by being coupled to the DC busses 106. For example, the second input 302b may be coupled to a negative-voltage, neutral, common, or other type of DC bus of the DC busses 106.

The first converter switch 500 is coupled to the first input 302a at a first connection, the second converter switch 502 and the first inductor 508 at a second connection, and is communicatively coupled to the controller 112 at a control connection. The second converter switch 502 is coupled to the first converter switch 500 and the first inductor 508 at a first connection, is coupled to the second input 302b at a second connection, and is communicatively coupled to the controller 112 at a control connection. The third converter switch 504 is coupled to the first input 302a at a first connection, is coupled to the fourth converter switch 506 and the third inductor 518 at a second connection, and is communicatively coupled to the controller 112 at a control connection. The fourth converter switch 506 is coupled to the third converter switch 504 and the third inductor 518 at a first connection, is coupled to the second input 302b at a second connection, and is communicatively coupled to the controller 112 at a control connection.

The first inductor 508 is coupled to the first converter switch 500 and the second converter switch 502 at a first connection, and is coupled to the first capacitor 510 and the second inductor 512 at a second connection. The first capacitor 510 is coupled to the first inductor 508 and the second inductor 512 at a first connection, and is coupled to a second reference node 530 at a second connection. The second inductor 512 is coupled to the first inductor 508 and the first capacitor 510 at a first connection, and is coupled to the first relay 514 at a second connection. In some examples, the second inductor 512 is inductively coupled to the fourth inductor 522. For example, the second inductor 512 may be inductively coupled to the fourth inductor 522 to allow ripple current to flow between the converter legs 306, 308, to reduce the ripple current in capacitors 510, 520 of power converter 300. In some examples, the first inductor 508 and the third inductor 518 may also be at least partially inductively coupled to each other to reduce ripple currents in each converter leg. For example, a ripple current in the first inductor 508 may induce an induced current in the third inductor 518, and a ripple current in the third inductor 518 may induce an induced current in the first inductor 508. The first relay 514 is coupled to the second inductor 512 at a first connection, is coupled to the first fuse 516 at a second connection, and is communicatively coupled to the controller 112. The first fuse 516 is coupled to the first relay 514 at a first connection, and is coupled to the output 304 at a second connection.

The third inductor 518 is coupled to the third converter switch 504 and the fourth converter switch 506 at a first connection, and is coupled to the second capacitor 520 and the fourth inductor 522 at a second connection. The second capacitor 520 is coupled to the third inductor 518 and the fourth inductor 522 at a first connection, and is coupled to the second reference node 530 at a second connection. The fourth inductor 522 is coupled to the third inductor 518 and the second capacitor 520 at a first connection, and is coupled to the second relay 524 at a second connection. The second relay 524 is coupled to the fourth inductor 522 at a first connection, is coupled to the second fuse 526 at a second connection, and is communicatively coupled to the controller 112. The second fuse 526 is coupled to the second relay 524 at a first connection, and is coupled to the output 304 at a second connection. The output 304 is coupled to the first fuse 516 and the second fuse 526, and is configured to be coupled to a load or a medium thereto, such as the output 304, which may be coupled to a load.

It is to be appreciated that the foregoing connections are examples, and that other configurations are within the scope of the disclosure. In some examples, a position of the first relay 514 may be swapped with a position of the first fuse 516 in the first converter leg 306. Similarly, a position of the first inductor 508, the first capacitor 510, and the second inductor 512 may be swapped with the first relay 514 and/or the first fuse 516 in the first converter leg 306. Similar principles apply to the second converter leg 308. Furthermore, although in some examples the output components 312, 316 may be coupled between the converter switches 310, 314 and the output 304 (for example, between the switch output of the converter switches 310, 314 and the output 304), in other examples, the output components 312, 316 may be coupled between the input 302 and the output components 312, 316.

Figure 6:
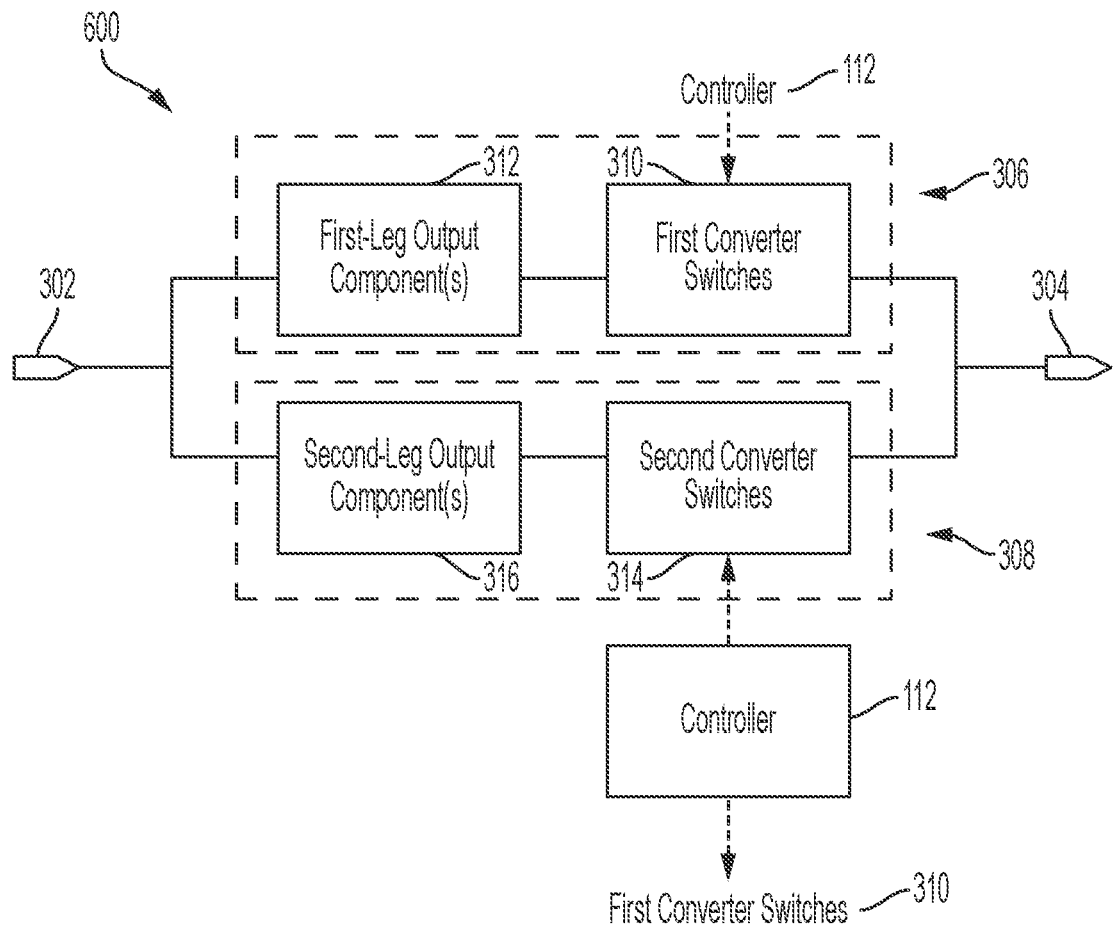
FIG. 6 illustrates a block diagram of a power converter according to another example.

For example, FIG. 6 illustrates a block diagram of a power converter 600 according to another example. The power converter 600 includes substantially similar components as the power converter 300 described above with reference to FIG. 3, and like components are labeled accordingly. However, the power converter 600 may be an example of the AC/DC converter 104 and/or the DC/DC converter 108. Components of the power converter 600 may therefore be arranged differently than those of the power converter 300, notwithstanding the fact that, in some examples, the components of the power converter 600 are substantially the same as those of the power converter 300. In some examples, components of the power converter 600, such as one or more components of the output components 312, 316, may differ from those of the power converter 300 as discussed below.

For example, the power converter 600 includes the input 302, the output 304, the first converter leg 306, and the second converter leg 308. The first converter leg 306 includes the first converter switches 310 and the first output components 312. The second converter leg 308 includes the second converter switches 314 and the second output components 316. However, components of the power converter 600 are arranged differently than those of the power converter 300.

For example, the input 302 is coupled to the first output components 312 and the second output components 316, the first converter switches 310 are coupled between the first output components 312 and the output 304, and the second converter switches 314 are coupled between the second output components 316 and the output 304. In an example in which the power converter 600 is implemented as the AC/DC converter 104, the input 302 may be coupled to the input 102, and the output 304 may be coupled to the DC busses 106. In an example in which the power converter 600 is implemented as the DC/DC converter 108, the input 302 may be coupled to the energy-storage-device interface 110, and the output 304 may be coupled to the DC busses 106.

The process 400 may be executed in connection with the power converter 600 in a substantially similar manner as with the power converter 300, although certain acts of the process 400 may differ. For example, at act 408, the controller 112 may control the converter switches 310, 314 to convert power received at the input 302 to converted power to provide at the output 304, but the conversion may include converting AC power to DC power, such as where the power converter 600 is an example of the AC/DC converter 104, and/or may include converting DC power to converted DC power, such as where the power converter 600 is an example of the DC/DC converter 108, rather than inverting DC power to AC power. However, other acts of the process 400, such as decreasing the current difference between the legs 306, 308 at act 414, may be substantially similar or identical.

Figure 7:
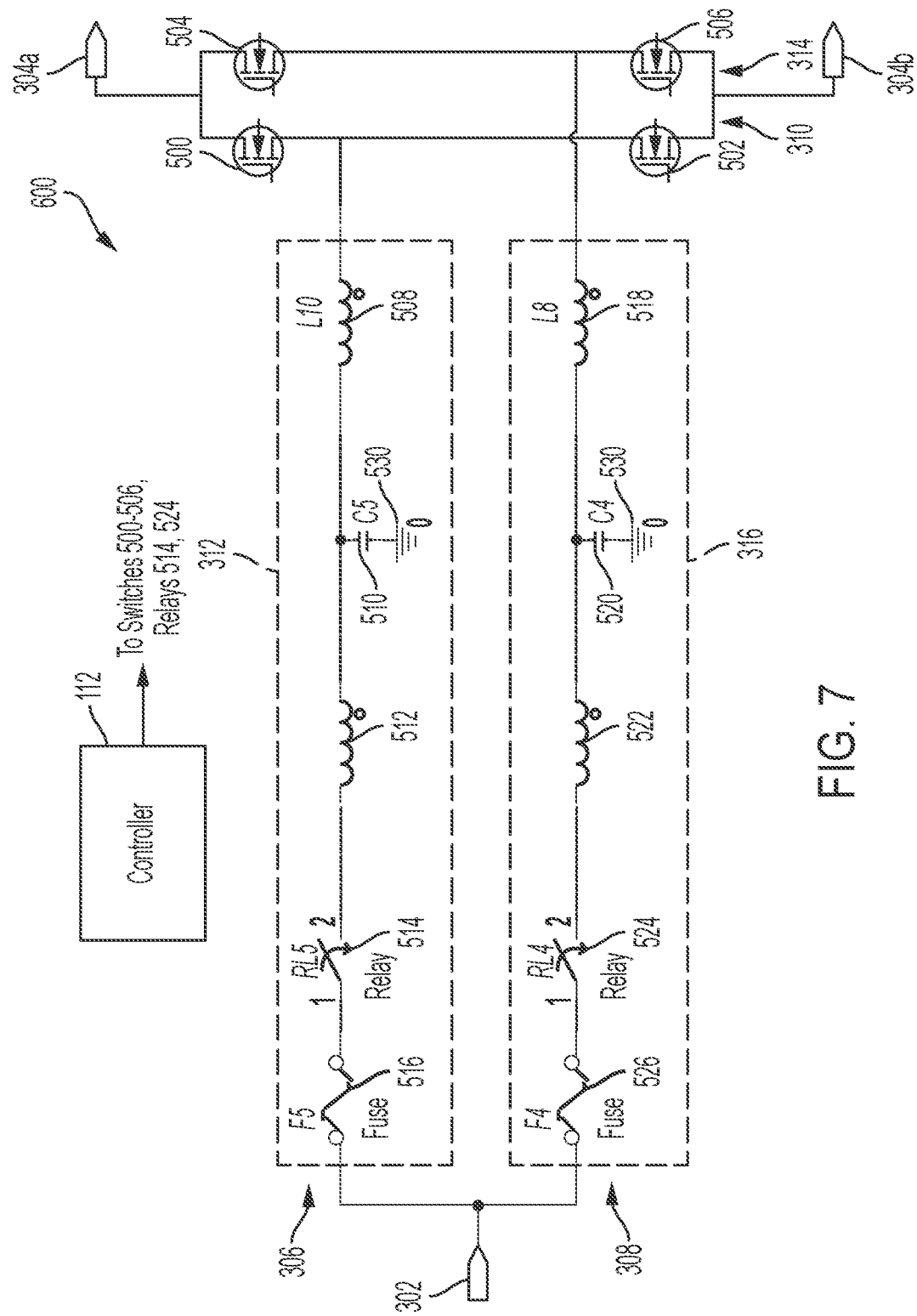
FIG. 7 illustrates a schematic diagram of the power converter of FIG. 6 according to an example.

FIG. 7 illustrates a schematic diagram of the power converter 600 according to an example. The power converter 600 of FIG. 7 may be an example implementation of the AC/DC converter 104, which may operate as a PFC. The power converter 600 of FIG. 7 includes the input 302, a first output 304a and a second output 304b (collectively, the output 304), the first converter leg 306, the second converter leg 308, the first converter switches 310, the first output components 312, the second converter switches 314, the second output components 316, the converter switches 500-506, the first inductor 508, the first capacitor 510, the second inductor 512, the first relay 514, the first fuse 516, the third inductor 518, the second capacitor 520, the fourth inductor 522, the second relay 524, and the second fuse 526. However, the components of the power converter 600 of FIG. 7 may be interconnected differently than the components of the power converter 300 of FIG. 5.

The input 302 is coupled to the first fuse 516 and the second fuse 526, and is configured to be coupled to a power source. For example, where the power converter 600 of FIG. 7 is an example of the AC/DC converter 104, the input 302 may be coupled to the input 102, which may be coupled to a power source. The first fuse 516 is coupled to the input 302 at a first connection, and is coupled to the first relay 514 at a second connection. The first relay 514 is coupled to the first fuse 516 at a first connection, and is coupled to the second inductor 512 at a second connection. In some examples, the first relay 514 is coupled to the controller 112 at a control connection. The second inductor 512 is coupled to the first relay 514 at a first connection, and is coupled to the first inductor 508 and the first capacitor 510 at a second connection. The first inductor 508 is coupled to the first capacitor 510 at a first connection, and is coupled to the first converter switch 500 and the second converter switch 502 at a second connection. The first capacitor 510 is coupled to the first inductor 508 and the second inductor 512 at a first connection, and is coupled to the second reference node 530 at a second connection.

The second fuse 526 is coupled to the input 302 at a first connection, and is coupled to the second relay 524 at a second connection. The second relay 524 is coupled to the second fuse 526 at a first connection, and is coupled to the fourth inductor 522 at a second connection. In some examples, the second relay 524 is coupled to the controller 112 at a control connection. The fourth inductor 522 is coupled to the second relay 524 at a first connection, and is coupled to the third inductor 518 and the second capacitor 520 at a second connection. The third inductor 518 is coupled to the fourth inductor 522 and the second capacitor 520 at a first connection, and is coupled to the third converter switch 504 and the fourth converter switch 506 at a second connection.

The first output 304a is coupled to the first converter switch 500 and the third converter switch 504, and is configured to be coupled to a load or a medium thereto. For example, the first output 304a may be coupled to a positive-voltage DC bus, or another type of bus, of the DC busses 106. The second output 304b is coupled to the second converter switch 502 and the fourth converter switch 506, and is configured to be coupled to a load or a medium thereto. For example, the second output 304b may be coupled to a negative-voltage, neutral, common, or other type of DC bus of the DC busses 106.

The first converter switch 500 is coupled to the first output 304a at a first connection, is coupled to the first inductor 508 and the second converter switch 502 at a second connection, and is communicatively coupled to the controller 112. The second converter switch 502 is coupled to the first inductor 508 and the first converter switch 500 at a first connection, is coupled to the second output 304b at a second connection, and is communicatively coupled to the controller 112 at a control connection. The third converter switch 504 is coupled to the first output 304a at a first connection, is coupled to the third inductor 518 and the fourth converter switch 506 at a second connection, and is communicatively coupled to the controller 112 at a control connection. The fourth converter switch 506 is coupled to the third converter switch 504 and the third inductor 518 at a first connection, is coupled to the second output 304b at a second connection, and is communicatively coupled to the controller 112 at a control connection.

As discussed above, the components of the power converter 600 of FIG. 7 may be substantially similar to the components of the power converter 300 of FIG. 5. However, the components of the power converter 600 of FIG. 7 may be interconnected differently inasmuch as a position of the converter switches 310, 314 may be switched with a position of the output components 312, 316, respectively. As discussed above, the controller 112 may control the converter switches 500-506 differently, such as by controlling the converter switches 500-506 to convert AC power received at the input 302 to converted DC power to provide to the output 304. Furthermore, whereas the power converter 300 of FIG. 5 may include the first input 302a, the second input 302b, and the output 304, the power converter 600 may include the input 302, the first output 304a, and the second output 304b.

Figure 8:
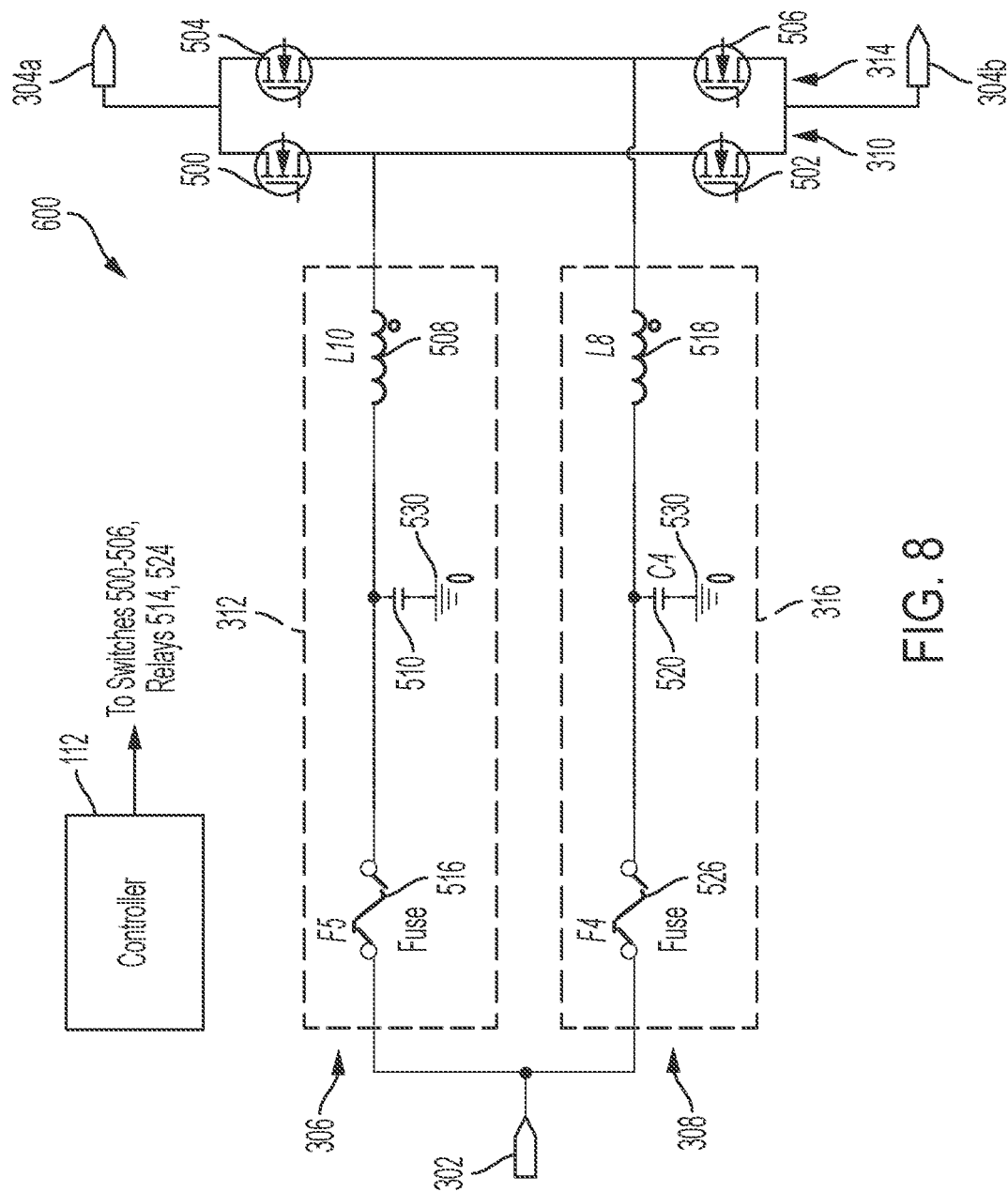
FIG. 8 illustrates a schematic diagram of the power converter of FIG. 6 according to another example.

In other examples, the power converter 600 may be implemented as another converter of the UPS 100, such as the DC/DC converter 108. FIG. 8 illustrates a schematic diagram of the power converter 600 according to another example. The power converter 600 of FIG. 8 may be an example implementation of the DC/DC converter 108, which may operate as a voltage-level converter. The power converter 600 of FIG. 8 includes the input 302, the first output 304a, the second output 304b, the first converter leg 306, the second converter leg 308, the first converter switches 310, the first output components 312, the second converter switches 314, the second output components 316, the converter switches 500-506, the first inductor 508, the first capacitor 510, the first fuse 516, the third inductor 518, the second capacitor 520, and the second fuse 526. The components of the power converter 600 of FIG. 8 may be interconnected differently than the components of the power converter 300 of FIG. 5 and the power converter 600 of FIG. 7.

The input 302 is coupled to the first fuse 516 and the second fuse 526, and is configured to be coupled to a power source. For example, where the power converter 600 of FIG. 8 is an example of the DC/DC converter 108, the input 302 may be coupled to the energy-storage-device interface 110, which may be coupled to a power source. The first fuse 516 is coupled to the input 302 at a first connection, and is coupled to the first inductor 508 and the first capacitor 510 at a second connection. The first inductor 508 is coupled to the first capacitor 510 at a first connection, and is coupled to the first converter switch 500 and the second converter switch 502 at a second connection. The first capacitor 510 is coupled to the first inductor 508 and the first fuse 516 at a first connection, and is coupled to the second reference node 530 at a second connection. The second fuse 526 is coupled to the input 302 at a first connection, and is coupled to the third inductor 518 and the second capacitor 520 at a second connection. The third inductor 518 is coupled to the second fuse 526 and the second capacitor 520 at a first connection, and is coupled to the third converter switch 504 and the fourth converter switch 506 at a second connection.

The first output 304a is coupled to the first converter switch 500 and the third converter switch 504, and is configured to be coupled to a load or a medium thereto. For example, the first output 304a may be coupled to a positive-voltage DC bus, or another type of bus, of the DC busses 106. The second output 304b is coupled to the second converter switch 502 and the fourth converter switch 506, and is configured to be coupled to a load or a medium thereto. For example, the second output 304b may be coupled to a negative-voltage, neutral, common, or other type of DC bus of the DC busses 106.

The first converter switch 500 is coupled to the first output 304a at a first connection, is coupled to the first inductor 508 and the second converter switch 502 at a second connection, and is communicatively coupled to the controller 112. The second converter switch 502 is coupled to the first inductor 508 and the first converter switch 500 at a first connection, is coupled to the second output 304b at a second connection, and is communicatively coupled to the controller 112 at a control connection. The third converter switch 504 is coupled to the first output 304a at a first connection, is coupled to the third inductor 518 and the fourth converter switch 506 at a second connection, and is communicatively coupled to the controller 112 at a control connection. The fourth converter switch 506 is coupled to the third converter switch 504 and the third inductor 518 at a first connection, is coupled to the second output 304b at a second connection, and is communicatively coupled to the controller 112 at a control connection.

As discussed above, the components of the power converter 600 of FIG. 8 may be similar to the components of the power converter 600 of FIG. 7. However, in the power converter 600 of FIG. 8, the first output components 312 do not include the first relay 514 and the second inductor 512, and the second output components 316 do not include the second relay 524 and the fourth inductor 522. Furthermore, the controller 112 may control the converter switches 500-506 differently, such as by controlling the converter switches 500-506 to convert DC power received at the input 302 (for example, from the battery 124 via the energy-storage-device interface 110) to converted DC power to provide to the output 304.

Accordingly, it is to be appreciated that various interleaved power converters are provided having multiple converter legs. Each converter leg may include one or more components, such as one or more filtering components, relays, fuses, and so forth. Because the components in each leg conduct current from only one converter leg, the components receive less current than, for example, had the components been implemented in a common configuration in which the components are coupled to all of the converter legs. Accordingly, a current rating of each of the components may be reduced.

Using the power converter 300 of FIG. 5 as an example, each of the converter legs 306, 308 may conduct an RMS current of approximately 116 A. As used herein, "approximately 116 A" may include between 115-117 A in one example; between 113-119 A in another example; between 110-120 A in another example; or other ranges in other examples. Rather than implementing a single set of output components coupled to both converter legs 306, 308 rated to receive approximately 232 A of current, the output components 312, 316 may only need to be rated to receive approximately 116 A of current each. For example, the fuses 516, 526 and relays 514, 524 may be implemented with components having a current rating of 160 A, which enables the fuses 516, 526 and relays 514, 524 to be implemented as PCB-mounted components, whereas it may be difficult or impossible to acquire a PCB-mounted fuse or relay rated to receive 232 A of current.

Additionally, in the case of the fuses 516, 526, a clearing energy of the fuses 516, 526 may be reduced as compared to, for example, a common fuse. Continuing with the foregoing example of implementing the fuses 516, 526 as fuses rated at 160 A, an $I^2t$ clearing energy of each fuse is 16 kA$^2$/s. Conversely, a common fuse rated at 315 A exhibits an $I^2t$ clearing energy of 82 kA$^2$/s. By implementing the fuses 516, 526 with lower current ratings than a common fuse, the clearing energy is reduced significantly and thus poses less danger to damaging adjacent components in the event of fuse being blown.

As discussed above, the inductors 512, 522 may be inductively coupled together to share a ripple current between the converter legs 306, 308. Such current sharing may reduce a ripple current in the capacitors 510, 520. In other examples, it may be advantageous to omit the inductive coupling of inductors 512, 522 to improve internal-resonance performance, which may vary based on design requirements. In other examples, it may be advantageous to omit the inductors 510, 520 entirely.

As discussed above, the power converters 300, 600 may be implemented in connection with any of the converters 104, 108, and/or 114. In some examples, the power converters 300, 600 may be implemented in all of the converters 104, 108, and 114. For example, the power converter 300 may be implemented in the DC/AC inverter 114, and the power converter 600 may be implemented in the AC/DC converter 104 as a PFC, and in the DC/DC converter 108. In other examples, fewer than all of the converters 104, 108, and 114 may be implemented in connection with the power converters 300, 600.

In some examples, a single common component may be replaced with one or more parallel-connected components. For example, a single common fuse may be replaced with two or more hard-parallel-connected fuses, and/or a single common relay may be replaced with two or more hard-parallel-connected relays. However, it may be difficult or impossible to obtain UL certification with hard-parallel-connected components. For example, if one parallel-connected fuse is blown, the remaining parallel-connected fuse(s) may be subjected to an excessively high voltage spike that prevents UL certification. Examples discussed above may therefore be advantageous inasmuch as no hard paralleling is implemented. Moreover, current sharing is provided in some examples, and balancing between the converter legs 306, 308 is achieved by the controller 112 detecting a current difference between the converter legs 306, 308 and decreasing the current difference.

Various controllers, such as the controller 112, may execute various operations discussed above. Using data stored in associated memory and/or storage, the controller 112 also executes one or more instructions stored on one or more non-transitory computer-readable media that may result in manipulated data. In some examples, the controller 112 may include one or more processors or other types of controllers. In one example, the controller 112 is or includes at least one processor. In another example, the controller 112 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply comprising:
    an input configured to be coupled to a primary power source;
    an output configured to be coupled to a load;
    a first converter leg configured to provide a first voltage signal to the output;
    a second converter leg configured to provide a second voltage signal to the output and configured to be coupled in parallel with the first converter leg;
    a first current sensor coupled to the first converter leg and being configured to provide a first current-sense signal indicative of a first current in the first converter leg;
    a second current sensor coupled to the second converter leg and being configured to provide a second current-sense signal indicative of a second current in the second converter leg; and
    at least one controller configured to:
        receive the first current-sense signal and the second current-sense signal;
        determine a current difference between the first converter leg and the second converter leg based on the first current-sense signal and the second current-sense signal; and
        decrease the current difference.

2. The uninterruptible power supply of claim 1, wherein the first converter leg includes a first filter and the second converter leg includes a second filter.

3. The uninterruptible power supply of claim 2, wherein the first converter leg includes at least one of a relay or a fuse coupled between the first filter and the output.

4. The uninterruptible power supply of claim 3, wherein the first filter includes at least one capacitor coupled to the at least one of the relay or the fuse.

5. The uninterruptible power supply of claim 4, wherein the first filter includes at least one inductor coupled to the at least one capacitor.

6. The uninterruptible power supply of claim 2, wherein the second converter leg includes at least one of a relay or a fuse coupled between the second filter and the output.

7. The uninterruptible power supply of claim 6, wherein the second filter includes at least one capacitor coupled to the at least one of the relay or the fuse.

8. The uninterruptible power supply of claim 7, wherein the second filter includes at least one inductor coupled to the at least one capacitor.

9. The uninterruptible power supply of claim 2, wherein the first filter includes a first choke and the second filter includes a second choke, the first choke being inductively coupled to the second choke.

10. The uninterruptible power supply of claim 9, wherein the first choke is configured to induce, responsive to a first ripple current passing through the first converter leg, a first induced current in the second choke.

11. The uninterruptible power supply of claim 9, wherein the second choke is configured to induce, responsive to a second ripple current passing through the second converter leg, a second induced current in the first choke.

12. The uninterruptible power supply of claim 1, wherein the first converter leg includes a relay and a fuse.

13. The uninterruptible power supply of claim 1, wherein the second converter leg includes a relay and a fuse.

14. The uninterruptible power supply of claim 1, wherein the first converter leg includes at least one power-conversion switch having a switch input and a switch output.

15. The uninterruptible power supply of claim 14, wherein the first converter leg includes at least one of a relay or a fuse coupled between the input and the switch input.

16. The uninterruptible power supply of claim 1, wherein the second converter leg includes at least one power-conversion switch having a switch input and a switch output.

17. The uninterruptible power supply of claim 16, wherein the second converter leg includes at least one of a relay or a fuse coupled between the input and the switch input.

18. The uninterruptible power supply of claim 1, wherein the first converter leg provides the first voltage signal out of phase with the second voltage signal.

19. A method of operating an uninterruptible power supply having an output configured to be coupled to a load, a first converter leg configured to provide a first voltage signal to the output, a second converter leg configured to provide a second voltage signal to the output and configured to be coupled in parallel with the first converter leg, a first current sensor coupled to the first converter leg and being configured to provide a first current-sense signal indicative of a first current in the first converter leg, and a second current sensor coupled to the second converter leg and being configured to provide a second current-sense signal indicative of a second current in the second converter leg, the method comprising:
    receiving the first current-sense signal and the second current-sense signal;
    determining a current difference between the first converter leg and the second converter leg based on the first current-sense signal and the second current-sense signal; and
    decreasing the current difference.

20. At least one non-transitory computer-readable medium storing thereon sequences of computer-executable instructions for operating an uninterruptible power supply having an output configured to be coupled to a load, a first converter leg configured to provide a first voltage signal to the output, a second converter leg configured to provide a second voltage signal to the output and configured to be coupled in parallel with the first converter leg, a first current sensor coupled to the first converter leg and being configured to provide a first current-sense signal indicative of a first current in the first converter leg, and a second current sensor coupled to the second converter leg and being configured to provide a second current-sense signal indicative of a second current in the second converter leg, the sequences of computer-executable instructions including instructions that instruct at least one processor to:

receive the first current-sense signal and the second current-sense signal;

determine a current difference between the first converter leg and the second converter leg based on the first current-sense signal and the second current-sense signal; and decrease the current difference.

* * * * *